Dec. 27, 1960        E. R. KNOWLES        2,965,932
METHOD OF MAKING A PLASTIC CONTAINER CAP
Filed Aug. 22, 1957        5 Sheets-Sheet 1

INVENTOR.
EDWARD R. KNOWLES
BY
ATTORNEY

Dec. 27, 1960  E. R. KNOWLES  2,965,932
METHOD OF MAKING A PLASTIC CONTAINER CAP
Filed Aug. 22, 1957  5 Sheets-Sheet 2

INVENTOR.
EDWARD R. KNOWLES
BY
*Harry B. Cook*
ATTORNEY

Dec. 27, 1960  E. R. KNOWLES  2,965,932
METHOD OF MAKING A PLASTIC CONTAINER CAP
Filed Aug. 22, 1957  5 Sheets-Sheet 3

INVENTOR.
EDWARD R. KNOWLES
BY
ATTORNEY

Dec. 27, 1960  E. R. KNOWLES  2,965,932
METHOD OF MAKING A PLASTIC CONTAINER CAP
Filed Aug. 22, 1957  5 Sheets-Sheet 4

INVENTOR.
EDWARD R. KNOWLES
BY
ATTORNEY

Dec. 27, 1960  E. R. KNOWLES  2,965,932
METHOD OF MAKING A PLASTIC CONTAINER CAP
Filed Aug. 22, 1957  5 Sheets-Sheet 5

INVENTOR.
EDWARD R. KNOWLES
BY
Harry B. Cook
ATTORNEY

United States Patent Office 2,965,932
Patented Dec. 27, 1960

2,965,932

METHOD OF MAKING A PLASTIC CONTAINER CAP

Edward R. Knowles, Fairfield, Conn., assignor to Newark Die Hobbing & Casting Co., Newark, N.J., a partnership Filed Aug. 22, 1957, Ser. No. 679,610

3 Claims. (Cl. 18—59)

This invention relates to plastic container caps or tops and, more particularly, to caps of so called "see-thru" type provided with a transparent plastic window for giving a clear view of the contents of the container with which such a cap is used.

Caps for containers which permit some view of the contents have been produced. However, it is my intention to produce caps with relatively rigid rims but with the center portions formed of very thin clear plastic which permit the container contents to be viewed as if the cap had been entirely removed, while protecting said contents against contamination.

In accordance with my invention, I propose to feed transparent material in sheet or film form to a molding machine, the top and bottom dies or parts of the mold of which are separable to afford a space for such material, indexing means being provided for causing said material to stop while plastic material in molten form is introduced intot the cavity formed by such dies or mold. After such material is cooled, the final lid or cap, consisting of a ring of material with a clear center window, is created. Such caps are then moved from between the die halves, as by means of a suitable indexing device, to a blanking machine where they are cut from the strip of plastic material and may be discharged from the machine through suitable discharge chutes. The strip of material travels on, after removal of the caps, as a continuous strip perforated where the caps have been removed, and may then pass to a scrap grinder.

A prime object of the invention is to provide a novel and improved container cap which shall comprise a semi-rigid rim and a thin, transparent window portion integrally connected to said rim.

Another object of the invention is to produce container caps each comprising an annular molded member of plastic material and having an inner peripheral portion and a window of thin clear plastic molded material integrally with said annular member and framed within said inner peripheral portion, and an outer peripheral portion integral with said inner peripheral portion and forming therewith an annular container-edge-receiving cavity.

A further object of my invention is to provide a method of making container caps comprising the steps of feeding a thin sheet of plastic material between upper and lower die parts, bringing said die parts together and injecting melted plastic material upon portions of one side of said sheet therebetween to form a plastic rim integral with said sheet and, separating said parts after said plastic material has hardened.

A further object of my invention is to produce a machine for making container caps, which machine comprises an upper die, a lower die positioned so as to mate with said upper die to form a complete mold when said dies are brought together, stripper means associated with said lower die, an operating member for said stripper means, means for intermittently feeding a thin sheet of plastic material between said upper and lower dies, means for moving one of said dies, apparatus having a nozzle for injecting plastic material in moldable condition into a die cavity when said dies are in engagement with one another, and means for, after molding has been effected and the plastic material sufficiently cooled, raising said stripper means with respect to said lower die to remove formed caps therefrom.

These and other objects and advantages will become apparent from the following detailed description when taken with the accompanying drawings. It will be understood that the drawings are for purposes of illustration and do not define the scope or limits of the invention, reference being had for the latter purpose to the appended claims.

In the drawings, wherein like reference characters denote like parts in the several views.

Figure 1:
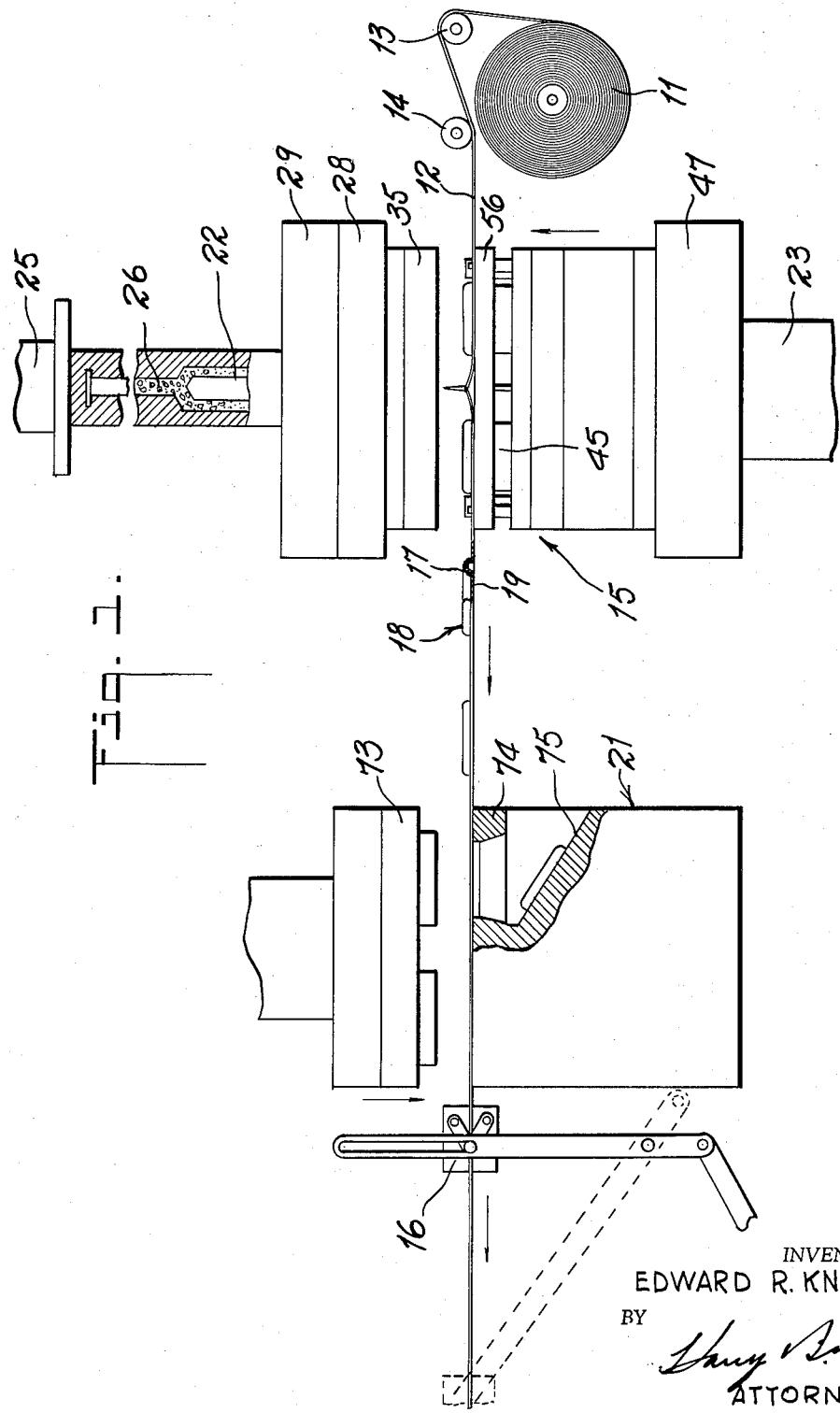
Figure 1 is a diagrammatic elevational view, with parts in section, of apparttus for practicing my invention.

Referring to the drawings in detail, like parts being designated by like characters, and first considering Figure 1, there is shown a roll 11 of plastic material 12 in the form of a thin sheet or film. This plastic material may be a film of vinyl, polyvinyl, polyethylene, styrene or other suitable tough transparent thermoplastic material, desirably .015" to .020" thick. This film may first pass over idler pulley 13, under idler pulley 14, and then be carried through a molding machine generally designated 15. The means for carrying this film through may consist of suitable indexing mechanism, diagrammatically indicated at 16, which carries the film a distance corresponding with the length of the mold in the machine 15, and then allows it to rest while the halves of the mold are closed or mated for the performance of the operation. After passing from the molding machine 15, the film 12, with molded rims 17 forming caps 18 with transparent centers or windows 19, is transported to a blanking mechanism 21, where the caps are cut from the sheet of film. At this point, the film is transported as a continuous perforated strip which may be conveyed to a scrap grinder, not shown.

While a section of the film 12 is in the molding machine, thermoplastic material 26 is heated to moldable condition in any suitable manner and introduced into a chamber 22. This plastic material 26 should be compatible and mutually fusible with respect to the material of the sheet 12. Means such as a piston in an operating cylinder 23 at the base of the molding device may close the mold, as by raising the lower portion or die 45. Then other means, such as a piston in a cylinder above the molding machine actuates a plunger which forces the plastic material under high pressure from chamber 22 through a nozzle 27 into the mold cavity. After a proper cooling interval which allows the thermoplastic material to solidify, the die halves are separated, the film is transported to carry the molded caps to the blanking die for separation from the film, and a new film portion is introduced for molding the rim portions of other caps onto the film for a repetition of the operation.

Figure 2:
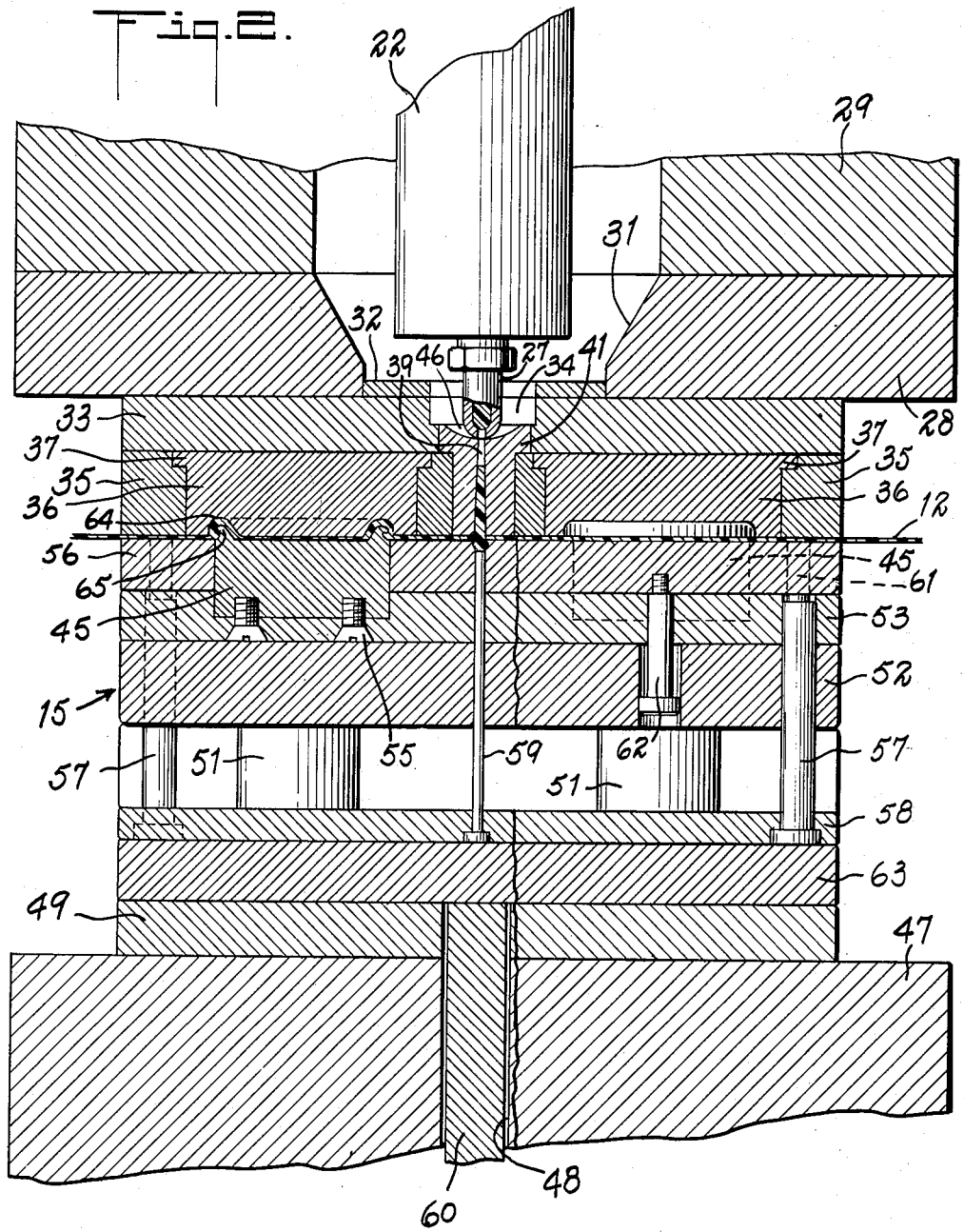
Figure 2 is a central vertical sectional view, except that the lower die members are in section on the line 3—3 of Figure 4, with parts in elevation, of the molding machine or portion of the apparatus of Figure 1, with the mold closed about a sheet of plastic material and molten plastic having been injected into the molds and upon said sheet.
Figure 3:
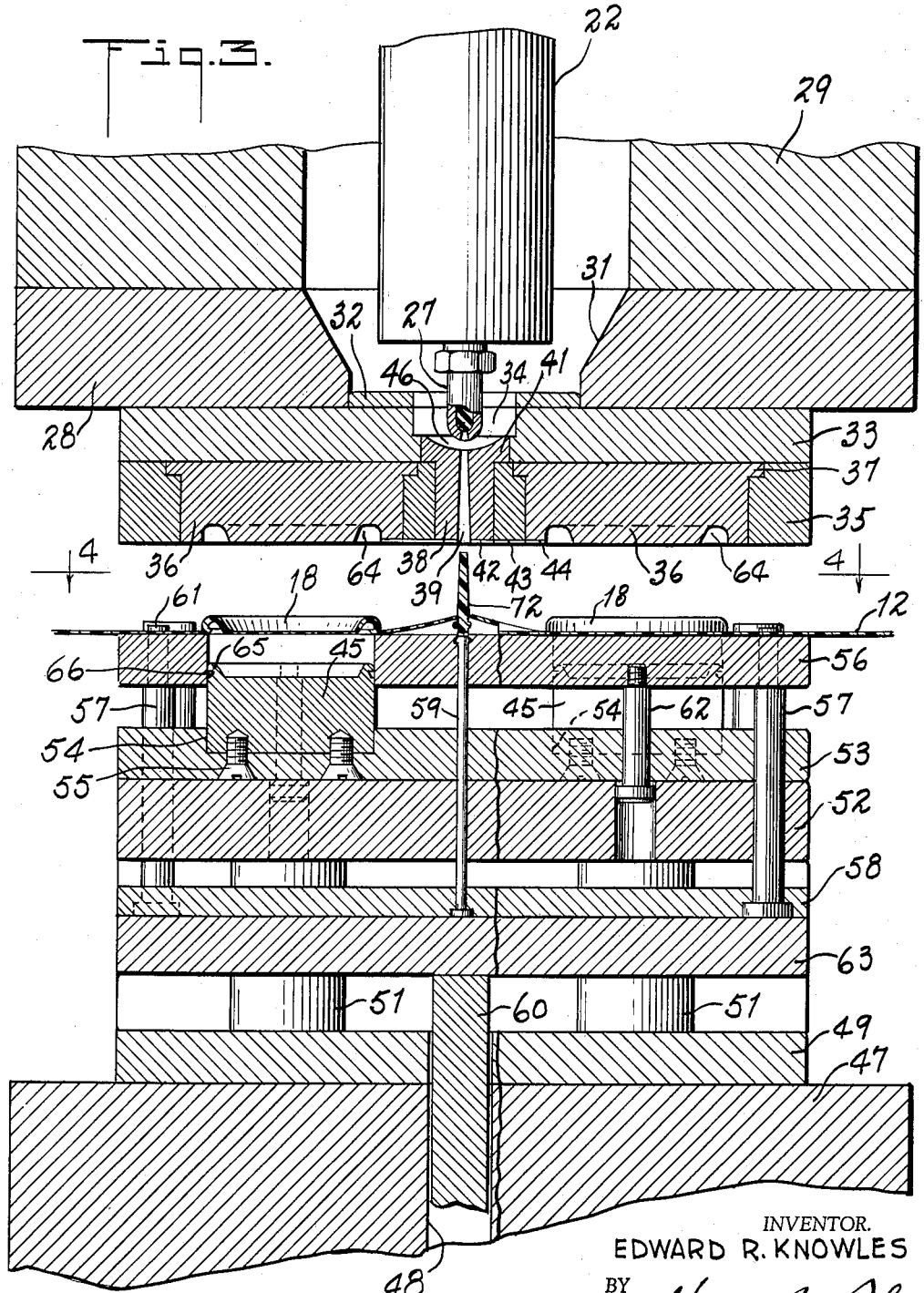
Figure 3 is a view corresponding to Figure 2, but showing the position of the parts after the lower dies or molding elements have been lowered to remove the upper and lower dies or die parts from registry with one another for opening the molds for removal of caps still attached to the sheet of plastic.
Figure 4:
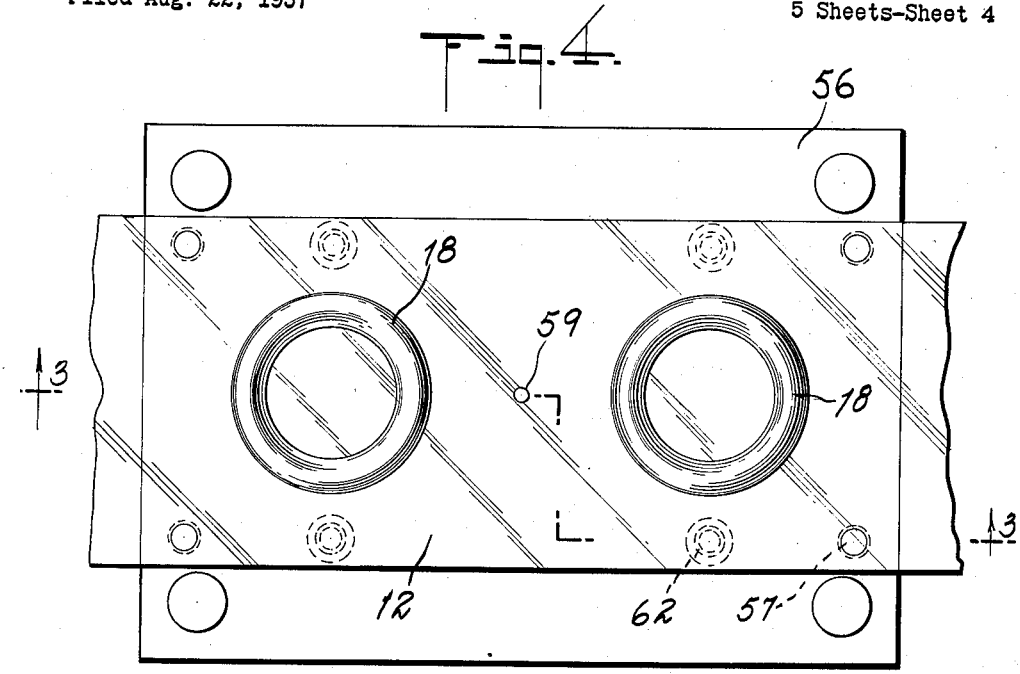
Figure 4 is a plan of the lower mold portion of the apparatus on the line 4—4 of Figure 3 in the direction of the arrows.
Figure 5:
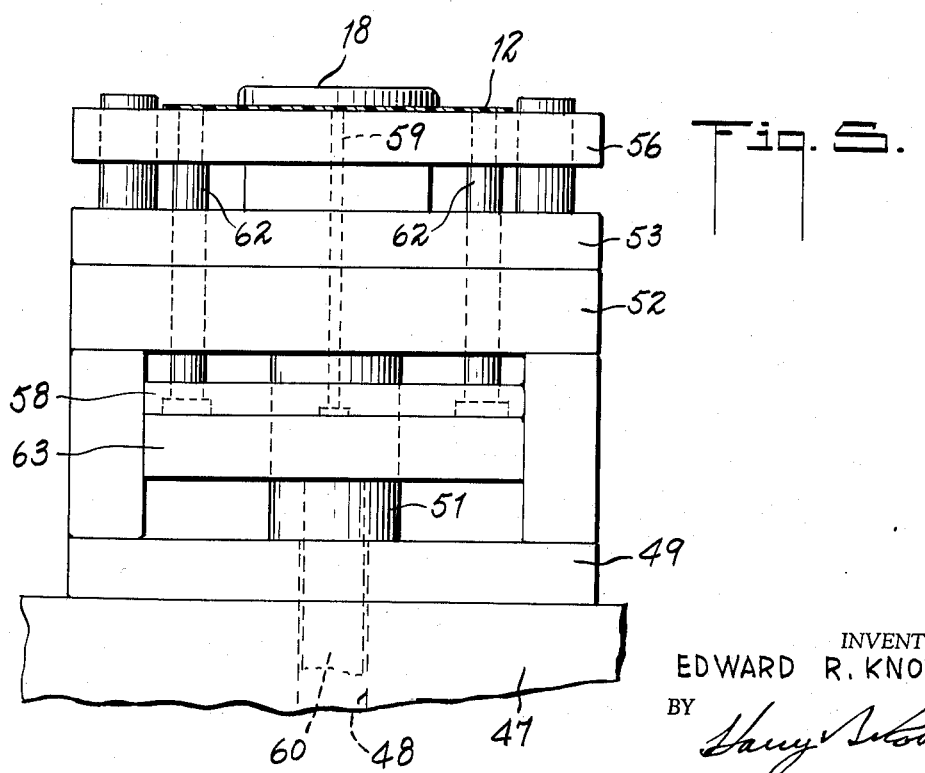
Figure 5 is an end elevation view of the lower molding parts from the right of the machine as shown in Figure 4.

The details of the molding mechanism are shown in Figures 2 to 7, inclusive. As will be seen from these figures, the molding machine desirably consists of a stationary upper die plate 28, suitably supported as from the upper member 29. This die plate 28 is desirably provided with a central aperture 31, generally funnel shaped as illustrated in Figures 2 and 3. In the aperture 31 is disposed a locating ring 32 resting on a back-up plate 33 disposed beneath the die plate 28. The back-up plate 33 is likewise desirably provided with a central aperture 34 registering with the ring 32. A cavity plate 35 is carried by the back-up plate and receives, in the present embodiment, a pair of upper mold members or cavity dies 36, said dies desirably having upper flanges 37 to hold them in place.

In the cavity plate 35, centrally disposed between the dies 36, in a contact bushing 38. This bushing desirably has a hole or sprue 39 for carrying molten material, said sprue enlarging in a downward direction so as to allow for convenient removal of the hardened sprue slugs. Said contact bushing desirably has an enlarged head portion 41, edge portions of which overlie the cavity plate to hold it in place. The sprue 39 is continued laterally as sprue grooves 42 to communicate with corresponding grooves 43 in the cavity plate, and 44 in the dies 36, for conveying molten plastic to the interior of the mold formed by the dies 36 and the dies 45 therebeneath when registering therewith.

For feeding molten plastic material into the dies when together to form molds, we have the plastic injecting container cylinder 22 from which the nozzle 27 extends. The nozzle opening is in line with the contact bushing opening or sprue 39 and, when the dies are separated, the nozzle is spaced therefrom slightly as viewed in Figure 3. The nozzle is approximately in contact with the bushing 38 when the dies are together, as viewed in Figure 2, so that then said nozzle is received in the upper cavity 46 of the contact bushing for directly ejecting molten material to the dies.

For operating the movable dies 45, we have a movable die plate 47 therebeneath, formed with a preferably vertical aperture 48. Resting on the plate 47 is an operating member plate 49, die-operating members 51 extending upwardly therefrom to support and operate a backing plate 52. A lower die plate 53 rests on said backing plate and the dies 45, here shown as a pair, are secured to said backing plate as by fitting them in upwardly open pockets 54. They may be held in said pockets by suitable means such as screws 55.

A stripper plate 56 is telescoped over the dies 45 and operated by knockout pins 57 mounted in a holding plate 58. These pins 57 pass through the backing plate 52 and the die plate 53 and are formed with reduced end portions 61 received in said stripper plate 56. The holding plate 58 also carries a sprue slug ejector 59 which likewise passes through the backing plate 52, the die plate 53, and part way through the stripper plate 56. The reduced end portions 61 of the knockout pins 57 are of such length that, when the mold is closed as shown in Figure 2, the shoulders between said ends and the bodies of the pins are spaced below the bottom of the stripper plate, so that the sprue slug ejector operates before the stripper plate, whereby said sprue slug 72 is removed before the molded caps 18 are raised from the dies 45.

Motion of the stripper plate 56 with respect to the die plate 53 is limited by stop pins 62, the upper ends of which are secured as by threading to the stripper plate and the lower headed end portions of which are adapted to engage the bottom surface of said die plate. The holding plate 58 rests on a knockout pin plate 63 which is operated by suitable means through its connection to the top of vertically reciprocable rod 60.

Figure 6:
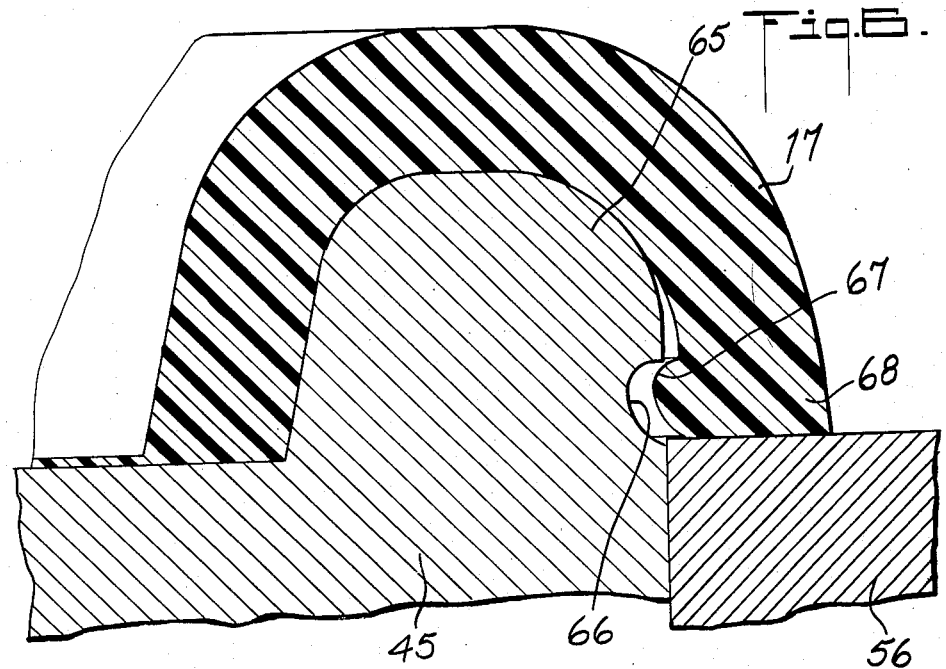
Figure 6 is a vertical axial sectional view greatly enlarged showing a completely formed cap in the process of being stripped from a lower die.

A desirable form of mold for making the caps referred to is shown most clearly in Figures 2, 3 and 6. Each upper portion or die 36 comprising said mold has a downwardly open annular groove or cavity 64, the upper portion of which is curved to give it an appearance generally inverted U-shape in section, or as viewed in Figure 3. At the adjacent sides of the dies 36, these cavities merge with the sprue grooves 44, so that melted plastic is receivable in said cavity through said grooves.

Each lower portion or die 45 has an upstanding annular ridge or boss 65, receivable in the corresponding cavity 64, with sufficient clearance to allow for the formation of the cap rim of desired thickness. The boss 65, however, has an outwardly opening peripheral groove 66, just big enough for the formation of a rib or bead 67 on the inner surface of the outer peripheral portion 68 of the rim 17 of the cap 19. The bead 67 makes it so that when a formed cap 18 is applied to a cup 69, as viewed in Figure 7, it will snap into place and thereby lock over the outstanding flange or bead 71, on the outer peripheral edge of said cup. The bead 67 on the cap rim, however, need only be relatively small, in fact, it desirably extends inwardly from the peripheral edge of the rim 17 only about .015". The curvature of the upper edge portion of said bead 67 is desirably about .010" in radius.

*Operation*

The apparatus described may be operated by threading the film or sheet 12 of plastic from the roll 11, over the pulley 13 and under the pulley 14, drawing it between the cavity plate 35 and the stripper plate 56 when the mold is in open position, as viewed in Figure 3, and over the lower shearing members 74 of the blanking mechanism 21. After this, it is engaged by the indexing mechanism 16, which is put in operation to draw the film intermittently and successively through the molding machine and blanking apparatus.

Figure 7:
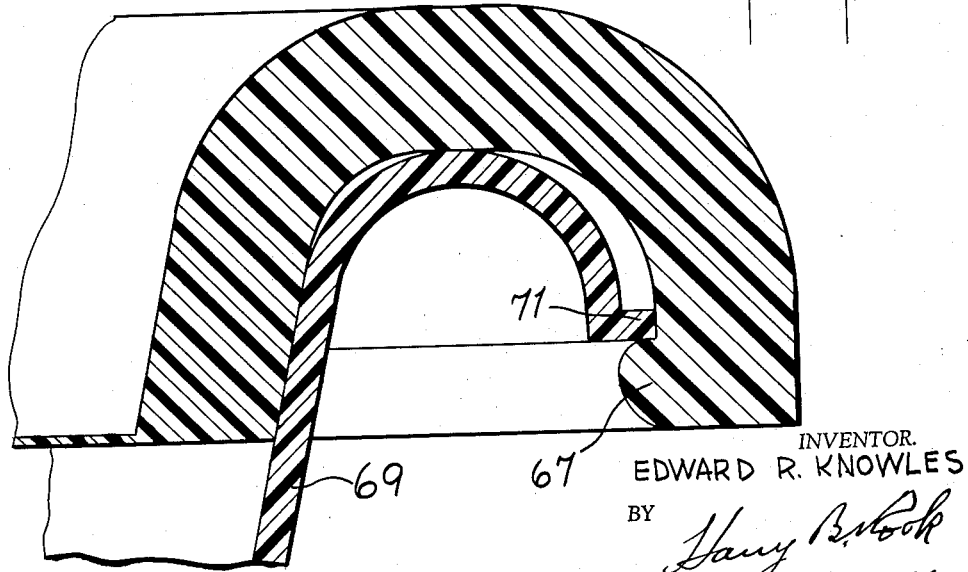
Figure 7 is a vertical axial sectional view enlarged, as in Figure 6, showing how such a cap will fit over the upper edge portion of a cup for which adapted.

The movable die plate 47 rises to lift the film 12, and press it between the dies 36 and 45, as viewed in Figure 2. While the said film is indexed, or its longitudinal movement through the molding machine 15 arrested, the heating cylinder 22 descends from the position of Figure 3 to that of Figure 2, whereupon melted plastic is ejected from the nozzle 27 through the sprue 39 and sprue grooves 42, 43 and 44, to flow upon the film 12, and fill the space in the cavity 64 above the boss 65, at the same time, effecting a surface melting of the film 12 to form therewith, in this instance, two integral caps 18, each of which includes a rim 17 molded from plastic material such as 26, and the compatible center window portion produced from the film 12. Each cap is suitable for snapping over the top edge portion of a cup, glass, jar, or other container formed as shown in Figure 7.

After a suitable cooling period which allows the molded material to solidify, the die plate 47 moves from the position of Figure 2 to that of Figure 3. That is, it drops while the knockout pin plate 63 is slightly raised by its operating member 60, to first remove the hardened sprue slug 72 and, shortly thereafter, the stripper plate 56 is raised by the knockout pins 57, to force the outer peripheral portion 68 of each cap rim 17 from the peripheral groove in its die 45, that is, from the position of Figure 3 to that of Figure 6. When the bead 67 clears the groove 66, the molded cap, integrally united with the remainder of the film 12, is raised to the position of Figure 1, or above the lower dies 45. Upon the next operation of the indexing mechanism 16, the film 12 is carried forward toward the blanking mechanism 21 and a new section of film disposed between the dies for a repetition of the operation.

Upon a pair of caps 18 being carried by the film 12 to the blanking mechanism, said caps upon reaching the position in said mechanism as illustrated in Figure 1, are pushed down by the upper shearing member 73, on to the lower shearing member 74, the cutting edges of the former engaging the cutting edges of the latter and severing the formed caps from the remainder of the film and attached sprue slug 72. The severed caps 18 pass out of the mechanism 21 along discharge chutes 75, the remainder of the film 12 being carried away from said mechanism to suitable processing mechanism such as a scrap grinder, not shown.

Having now described my invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. The method of making a container cap comprising feeding a thin sheet of plastic material between upper and lower die parts, bringing said die parts together and at that time injecting upon the portions of said sheet therebetween an annulus of a melted plastic material that is compatible and fusible with the material of said sheet to form a rim of plastic material integrally fused with the top of said sheet, and, while said sheet is positioned between said die parts, separating said parts after said plastic material has hardened.

2. The method of making a container cap comprising feeding a thin sheet of thermoplastic material between an upper stationary die and a lower movable die, bringing said dies together and at that time injecting upon the portions of said sheet between said dies an annulus of a molten thermoplastic material that is compatible and fusible with the material of said sheet to form a rim of plastic material integrally fused with the top of said sheet, and, while said sheet is positioned between said dies retracting said lower dies after said plastic material has hardened, ejecting the hardened sprue slug which has formed between the supply of melted plastic material and the dies, and stripping said rim and the sheet of plastic material from said lower die.

3. The method of making a container cap comprising feeding a thin sheet of plastic material between an upper stationary die and a lower movable die, bringing said dies together and at that time injecting upon portions of said sheet between said dies an annulus of a molten plastic material that is compatible and fusible with the material of said sheet to form a rim of plastic material integrally fused with the top of said sheet, and, while said sheet is positioned between said dies, retracting said lower die after said plastic material has hardened, ejecting the hardened sprue slug which has formed between the supply of molten plastic material and the dies, stripping said rim and the sheet of plastic material from said lower die, moving said rim and the attached sheet from between said dies, and separating the rim and sheet portion within the outer periphery of said rim from the body of said sheet.

References Cited in the file of this patent

UNITED STATES PATENTS

| | | |
|---|---|---|
| 1,904,268 | Bronson | Apr. 18, 1933 |
| 2,568,771 | Smith | Sept. 25, 1951 |
| 2,614,727 | Robinson | Oct. 21, 1952 |
| 2,619,679 | Baldanza | Dec. 2, 1952 |
| 2,718,980 | Strom | Sept. 27, 1955 |
| 2,720,681 | Danielson et al. | Oct. 18, 1955 |
| 2,739,349 | Struss | Mar. 27, 1956 |
| 2,762,080 | Heinze et al. | Sept. 11, 1956 |

FOREIGN PATENTS

| | | |
|---|---|---|
| 493,009 | Great Britain | Sept. 30, 1938 |